Jan. 18, 1966   J. E. WALDRUM   3,229,913
LAWN SPRAYING DEVICE
Filed Dec. 17, 1963   2 Sheets-Sheet 1

INVENTOR.
JOHN E. WALDRUM
BY
Caesar and Rivise
ATTORNEYS.

Jan. 18, 1966   J. E. WALDRUM   3,229,913
LAWN SPRAYING DEVICE
Filed Dec. 17, 1963   2 Sheets-Sheet 2

INVENTOR.
JOHN E. WALDRUM
BY
Caesar and Rivise
ATTORNEYS.

United States Patent Office 3,229,913
Patented Jan. 18, 1966

1

3,229,913
LAWN SPRAYING DEVICE
John E. Waldrum, Ambler, Pa., assignor to Amchem Products, Inc., Ambler, Pa., a corporation of Delaware
Filed Dec. 17, 1963, Ser. No. 331,187
8 Claims. (Cl. 239—225)

This invention relates to a lawn spraying device and has as its objective the provision of a new and improved device of this general class.

With the advent of certain heavy, viscous liquids in the herbicide field and in the agricultural field in general, need has arisen for a spraying device which will handle thin or thick liquids. Conventional spraying devices are generally not equipped to handle heavy liquids because of the requirement of having to perform substantial work thereon. For this reason a special class of spraying devices has developed to handle the spraying of heavy, viscous liquids, such as herbicides. These devices are exemplified by the applicant's prior Patents No. 2,917,242 and No. 2,965,302. In Patent No. 2,917,242 the thick, viscous liquid was fed to a spinning recessed plate from which the liquid was discharged by centrifugal force through spray heads. In Patent No. 2,965,302 the thick, viscous liquid was discharged from rotating nozzles into an air stream with laterally projecting blades adjacent the nozzles being positioned in the downstream path of the air flow.

The problem of controlling droplet size in the spraying of heavy liquids was also recognized by the present applicant in the provision of a spraying device in prior co-pending application Serial No. 303,906 filed August 22, 1963. In addition to all of the foregoing the present applicant recognized in application Serial No. 331,185 filed December 17, 1963, the need for a device which would spray thick, viscous liquids without the necessity of performing substantial work thereon.

There are some instances, however, when it is desirable that the same spraying device should handle both a thin or a thick liquid, depending upon the requirements of the particular circumstances. Such a device must be reliable, and must be responsive to the particular problems occasioned by the handling of the thin or thick liquids.

It is therefore an object of the present invention to provide a lawn spraying device which can handle thin or thick liquids.

Still another object of the present invention is to provide a lawn spraying device which will not be substantially affected by the thinness or thickness of the particular liquid being handled.

Still another object of the present invention is to provide a lawn spraying device for handling thin or thick liquids which can be economically manufactured and yet which will be reliable in performance.

The foregoing as well as other objects of the invention are achieved by providing a lawn spraying device which includes an inlet tube or stator that is adapted to be opened or closed by means of the release of a ball valve therefrom. This is controlled by a centifugal valve release plate comprising two parts which are adapted to be separated slightly upon rotation thereof in order to permit the ball valve to drop away from the stator opening. Rotation of the centrifugal valve release plate is accomplished by means of a gear-driven rotor to which the centrifugal valve release plate is coupled.

2

Other objects and many of the attendant advantages of the present invention will be readily appreciated as the same becomes better understood by reference to the following detailed description when considered in connection with the accompanying drawings wherein.

Figure 1:
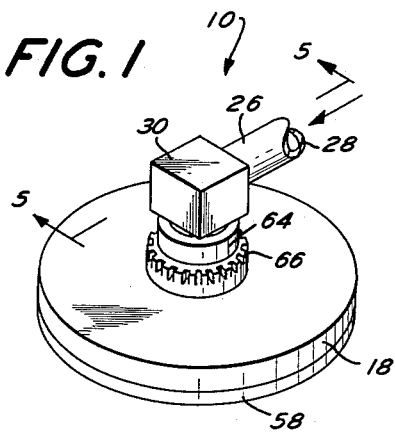
FIG. 1 is a perspective view of a lawn spraying device embodying the present invention.

Referring now to the various figures of the drawing wherein like reference characters refer to like parts, there is shown in FIG. 1 a lawn spraying device 10 embodying the present invention. The various elements comprising the device 10 are shown in detail in the exploded view of FIG. 2.

Thus, the present device 10 comprises an inlet tube or stator 12 having a passageway adapted to be opened by means of the release of a ball valve 14 therefrom. This is controlled by a centrifugal valve release plate 16 comprising two parts which are adapted to be separated slightly upon rotation thereof in order to permit the ball valve 14 to drop away from the stator 12. Rotation of the centrifugal valve release plate 16 is accomplished by means of a gear-driven rotor 18 to which the centrifugal valve release 16 is coupled.

Figure 2:
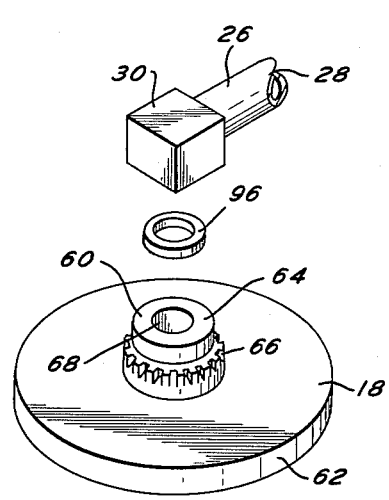
FIG. 2 is an exploded perspective view of the device of FIG. 1.

The various elements of the present invention are illustrated in detail in the exploded view of FIG. 2.

Figure 5:
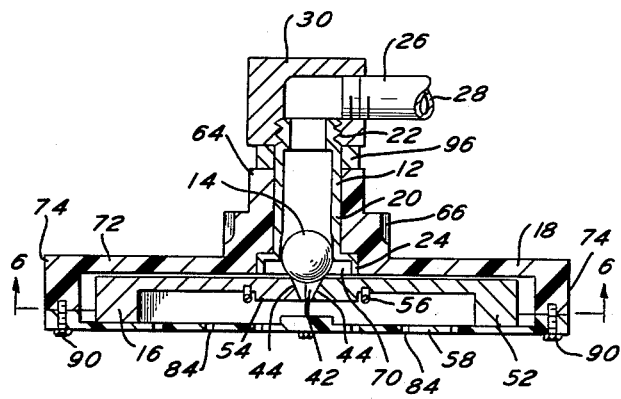
FIG. 5 is an enlarged sectional view taken along the lines 5—5 of FIG. 1.

Thus, the stator 12 is essentially a length of tubing 20 having external threads 22 formed adjacent one end thereof and having flange 24 formed adjacent the other end thereof. As shown in FIG. 5, the external threads 22 of the stator 12 are adapted to interfit with complementary internal threads in the socket of liquid inlet 26 comprising a tube portion 28 and head portion 30.

It is to be further noted that the stator 12 is fixed and that the rotor 18 is adapted to rotate with respect thereto. Since the rotor 18 is essentially telescoped about the stator 12 shown in FIG. 5, the flange 24 of the stator 12 also serves as a bearing to support the rotor 18 as shown in FIG. 5.

Figure 3:
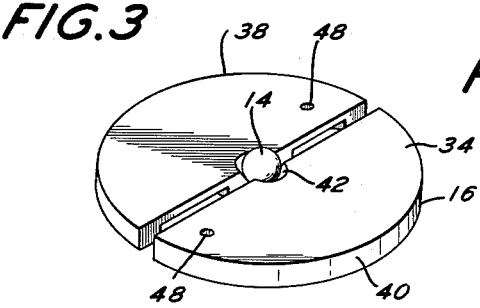
FIG. 3 is a slightly perspective view showing the inner surface of the centrifugal valve release plate.
Figure 4:
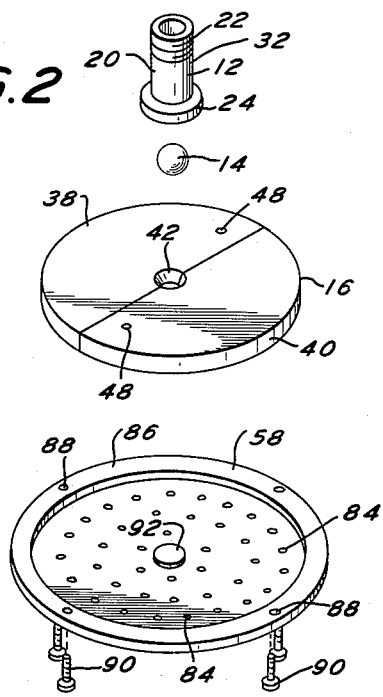
FIG. 4 is a perspective view similar to FIG. 3 but showing the outer surface of the centrifugal valve release plate.
Figure 4:
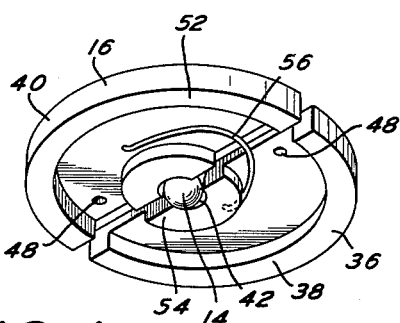

The centrifugal valve release plate 16 is shown in detail in FIGS. 3 and 4, the inner surface 34 being shown in detail in FIG. 3 and the outer surface 36 being shown in detail in FIG. 4.

Figure 7:
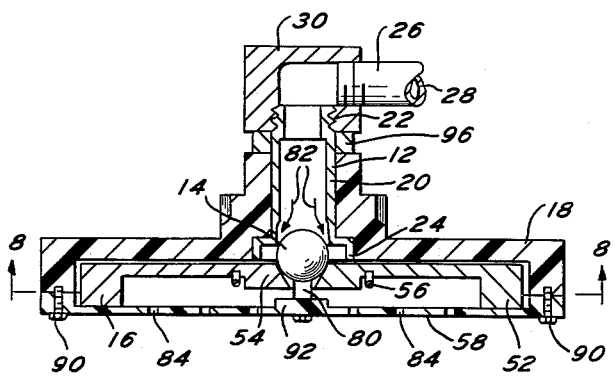
FIG. 7 is a sectional view similar to FIG.5 but showing the ball valve in the released position.
Figure 10:
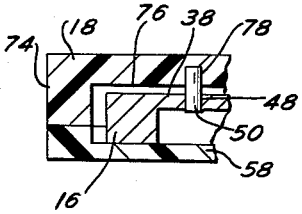
FIG. 10 is an enlarged sectional view taken along the lines 10—10 of FIG. 8.

The centrifugal valve release plate 16 is comprised of two essentially identical plates 38 and 40 having a general semi-circular shape. As shown in FIG. 2 each of the plates 38 and 40 have a small tapering arcuate segment removed therefrom so that the two plates 38 and 40 when brought together as shown in FIG. 2 define an opening 42 which is comprised of converging walls 44 as illustrated in FIG. 5. As will be explained hereinafter, the plates 38 and 40 are separated slightly upon rotation of the centrifugal valve release 16. When this occurs, the parting of the converging walls 44 permit a gradual dropping away of the ball valve 14 as illustrated in FIG. 7. The inner surface 34 of the centrifugal valve release 16 also includes two guide holes 48, each of which receive a portion of a coupling pin 50 (FIG. 10) in order that the centrifugal valve release 16 will rotate along with the rotor 18.

The outer surface 36 of the centrifugal valve release plate 16 is illustrated in FIG. 4 and is shown to include a peripheral flange 52 and a central collar 54 which in part is defined by the converging walls 44 of the opening 42. A spring 56 is secured to the outer surface 36 in order that the plates 38 and 40 will spring together whenever a force tending to pull them apart is halted.

The rotor 18 is best shown in FIGS. 2, 5 and 7, and basically comprises a short section 60 and a housing section 62. As shown in FIG. 5, the short section 60 includes a collar 64 which merges into an integral gear 66 by which the rotor 18 is rotated.

As noted in FIG. 5, the rotor 18 includes a central bore 68 which expands somewhat at 70 in order that the rotor 18 may be telescoped upon the centrifugal valve release plate 16, and thereby supported by the valve release plate 16.

Figure 6:
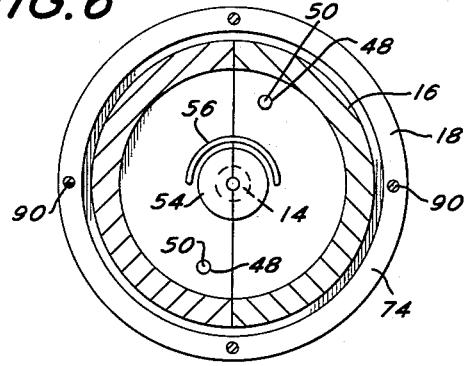
FIG. 6 is a sectional view on a slightly reduced scale taken along the lines 6—6 of FIG. 5.
Figure 8:
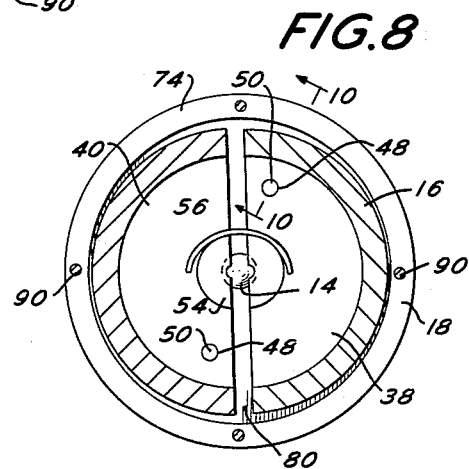
FIG. 8 is a sectional view on a slightly reduced scale taken along the lines 8—8 of FIG. 7.

The housing section 62 of the rotor 18 is essentially comprised of a plate 72 and flanges 74. As noted in FIG. 10, the under-surface 76 of the rotor 18 includes guide holes 78 which are complementary to guide holes 48 in the valve release 18. The guide holes 48 and 78 receive a portion of the coupling pin 50 whereby rotation of the rotor 18 will cause rotation of the valve release 16. In addition to the foregoing, the coupling pins 50 also permit the plates 38 and 40 which comprise the valve release 16 to pivot slightly from the closed position of FIG. 6 to the somewhat separated position of FIG. 8 thereby providing clearance 80. This occurs when the rotor and valve release are being rotated whereby the centrifugal force of rotation causes each of the plates 38 and 40 to pivot respectively about the coupling pins 50 thereby creating a clearance 80 which is the separation between the plates. As shown in FIG. 8, the pivoting of the plate 38 will be slightly in counterclockwise sense about upper pin 50 whereby the pivoting of plate 40 will be in a counterclockwise sense about the lower pin 50. As soon as rotation stops the plates will immediately turn to the unitary position of FIG. 6 inasmuch as the spring 56 had been elongated during the separation of the plates and therefore exerts a resilient action upon the plates causing them to return together as soon as the rotation has stopped.

It is to be noted that the clearance 80 was created by the separation of the plates 38 and 40 as viewed in FIG. 8. This in turn had the effect of causing a separation of the converging walls 44 which comprised the opening 42 in the valve release plate 16. When this occurred, the ball valve 14 was permitted to drop to the position of FIG. 7 thus establishing a clearance between the surface of the ball valve and the internal surface of the opening in the stator 12. For this reason, liquid which has been permitted to enter inlet 26 may flow as shown by arrows 82 in FIG. 7 around the ball 14 and through the opening 42 in the valve release 16 and then pass through spray openings 84 in the dispersion disc 58.

As shown in FIG. 2, the inner face of the dispersion disc 58 includes a peripheral collar 86 having spaced openings 88 in order to receive bolts 90 which fasten the dispersion disc to the end surfaces of the flanges 74 of the rotor 18.

Figure 9:
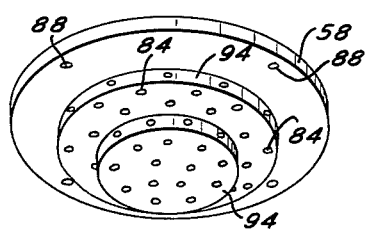
FIG. 9 is a perspective view of an alternative dispersion disc that may be utilized with the present invention.

Alternately, as shown in FIG. 9, the dispersion disc 58 may take the form of concentric rows or steps 94, each of which have spray openings 84 formed therein.

In operation a rotating gear (not shown) meshes with the integral gear 66, thereby causing the rotor 18 to rotate with the liquid inlet 26 and the stator 12 being stationary. A thrust washer 96 may be provided to facilitate the aforesaid relative rotation. As will be apparent from FIG. 5, the rotor 18 is telescoped about the stator 12, and is supported thereby by virtue of the interaction of the flange 24 of the stator and the expansion of the bore 68 of the rotor. Accordingly, the rotor 18 effectively revolves about the stator 12.

Since the centrifugal valve release plate 16 is coupled to the under-surface 76 of rotor 18 by means of coupling pins 50 being held within openings 48 and 78, rotation of the rotor 18 also causes rotation of the centrifugal valve release plate 16. This in turn initiates a slight pivoting action of the plates 38 and 40 which comprise the valve release plate 16 thereby causing the converging walls 44 defining opening 42 in the valve release to be spread. With walls 44 in a separated condition, the ball valve 14 drops somewhat to the position of FIG. 7 thereby permitting the liquid to flow between the ball 14 and the inner surface of the stator 12.

The separation between the plates 38 and 40 is along the entire middle section thereof as illustrated in FIG. 8 and accordingly the liquid may pass to dispersion disc 58. As soon as the rotation of the rotor 18 is ended, the spring 56 causes the plates 38 and 40 to return to the closed position of FIG. 6 thereby utilizing the converging shape of the walls 44 to force the ball valve 14 to return to the initial closed position of FIG. 5 and prevent additional flow of liquid from inlet 26.

It is to be noted that the action of the plates 38 and 40 in becoming separated to permit the dropping of the ball valve 14 is essentially independent of the type of liquid being handled. In other words, the plates 38 and 40 will perform the same slight pivoting and separation action of FIG. 8 irrespective of whether a thin or a thick liquid is being handled and the ball valve 14 will also function irrespective of the type of liquid being handled.

Obviously many modifications and variations of the present invention are possible in the light of the above teachings. It is, therefore, to be noted that within the scope of the appended claims the invention may be practiced otherwise than as specifically described.

What is claimed as the invention is:

1. A lawn spraying device for handling thin or thick liquids comprising an inlet tube having first and second open ends, said second open end being adapted to be closed for a predetermined time by ball valve means, a centrifugal valve release plate having at least two sections and being spaced from said second open end, said valve release plate being adapted to freely support said ball valve means, means to rotate said valve release plate, means to supply liquid to said first open end and means to rotate said valve release plate, said last-named means causing said plate sections to separate upon rotation, said ball valve means thereby dropping away via gravity from said second open end and said liquid discharging therefrom, and whereby when said valve release plate is stationary, said ball valve means closingly engages said second open end.

2. The invention of claim 1 wherein a gear driven rotor rotates said valve release plate.

3. The invention of claim 2 wherein said rotor is telescoped about said inlet tube, and a dispersion disc having discharge openings formed therein is secured to said rotor outwardly of said valve release plate.

4. The invention of claim 3 wherein said dispersion disc is comprised of a plurality of concentric steps.

5. The invention of claim 2 wherein said inlet tube supports said rotor.

6. The invention of claim 1 wherein said plate sections are resiliently biased towards each other.

7. The invention of claim 6 wherein said plate sections are each pivotally eccentrically mounted for slight pivoting away from each other whereby said plate sections may separate upon rotation of said valve release.

8. The invention of claim 1 wherein said plate sections include edges inclined toward each other adjacent the seating of said ball valve means.

References Cited by the Examiner
UNITED STATES PATENTS

| | | | |
|---|---|---|---|
| 1,133,706 | 3/1915 | Caselli | 239—225 X |
| 1,230,481 | 6/1917 | Guthrie | 137—53 |
| 2,917,241 | 12/1959 | Waldrum | 239—214 |
| 3,150,673 | 9/1964 | Wood | 137—56 |

M. HENSON WOOD, Jr., *Primary Examiner.*
EVERETT W. KIRBY, *Examiner.*